June 22, 1948.　　　J. R. BOETTLER ET AL　　2,443,594
APPARATUS FOR HEATING DIELECTRIC MATERIALS
Filed April 2, 1943　　　　　　　　　　　　　2 Sheets-Sheet 1

INVENTORS: J. R. BOETTLER
R. BURNS
BY J. W. Schmied
ATTORNEY

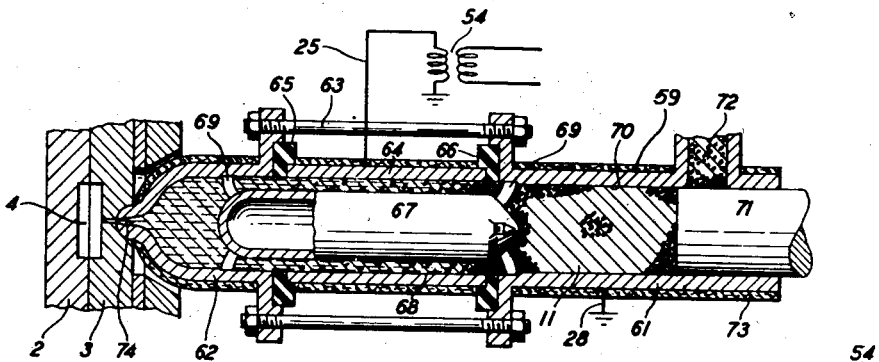
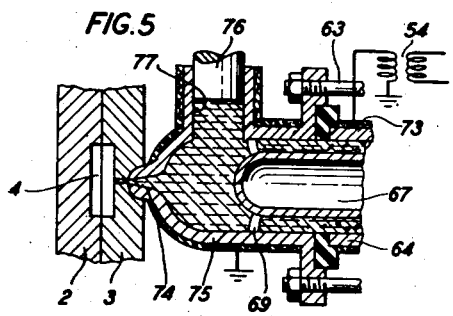
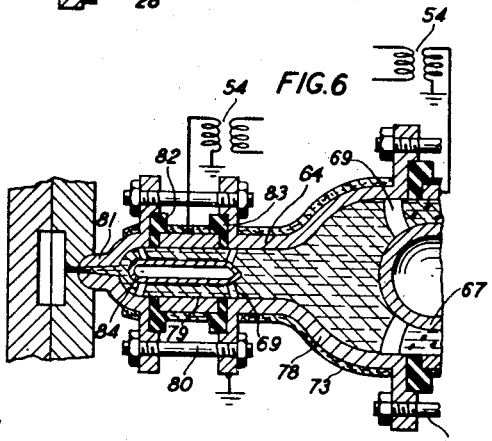
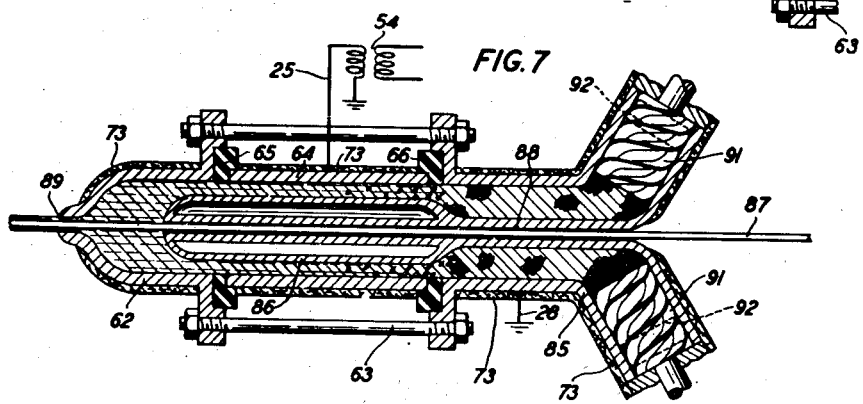

Patented June 22, 1948

2,443,594

UNITED STATES PATENT OFFICE 2,443,594

APPARATUS FOR HEATING DIELECTRIC MATERIALS

Jacob R. Boettler, Chatham, N. J., and Robert Burns, Garden City, N. Y., assignors to Bell Telephone Laboratories, Incorporated, New York, N. Y., a corporation of New York Application April 2, 1943, Serial No. 481,542

5 Claims. (Cl. 219—47)

This invention relates to apparatus for heating materials, and more particularly to apparatus for heating by high frequency electrical currents dielectric materials capable of being heated due to their dielectric losses when they are subjected to a high frequency electrostatic field.

While apparatus embodying the present invention is applicable to the heating of various kinds of dielectric materials, it provides particular advantages when employing for heating organic dielectric materials which are capable of being put into a plastic state by heat, hereafter termed "thermoplastic materials," such as may be employed for molding, coating or similar purposes. For illustrative purposes, the invention will be discussed hereinafter with the heating of such materials.

Organic thermoplastic materials heretofore have usually been heated by means of heat applied to a container in which a mass of the material is disposed, conduction of heat from the walls of the container and through the body of thermoplastic material being relied upon to heat the material throughout its mass and put it into a plastic state suitable for molding, coating or other purposes. However, the organic thermoplastic materials employed for such purposes in general are poor conductors of heat. Therefore, when such a material is thus heated by conduction, one or more portions of the mass of the material, usually the portions in contact with or adjacent the container walls, are often heated to higher temperatures than are other portions of the material. Indeed, certain portions of the mass of the material are often harmfully overheated in heating sufficiently the innermost portions of the material; due to such overheating such organic materials are often harmfully decomposed, as by decomposition or depolymerization of their molecular structure.

For example, in molding with an organic material which is heated to put it into a plastic state, it often happens that the portions of the thermoplastic molding material adjacent the container walls of the heater are heated to such high temperatures that they are subject to harmful decomposition, while those portions farthest away from the heater walls are insufficiently fluid. Many of the wide differences of physical properties of molded synthetic resin parts heretofore produced under apparently identical molding conditions are traceable to unequal heating of the molding material by conduction heating apparatus.

In coating objects with or forming sheets of organic thermoplastic materials which must be heated to put them in a plastic state, similar difficulties occur because of non-uniform heating when conduction heating apparatus is employed.

These and other difficulties inherent in prior practices are overcome by the apparatus of the present invention. The present invention provides heating apparatus which uniformly heats materials, such as organic thermoplastic materials, even though they have poor heat conduction properties, provided such materials are dielectric materials in the sense that they are capable of being heated due to their dielectric losses when subjected to a high frequency electrostatic field.

Apparatus embodying the present invention comprises an electrically conductive container in which is disposed the material to be heated constituting one electrode of an electrical condenser and connected to a source of suitable high frequency electrical energy, an electrically conductive electrode constituting the other electrode of said condenser connected to said source and disposed in said container in spaced and insulated relation thereto, and means for passing a flowable mass of the dielectric material to be heated through the space between the container and the electrode and ejecting it from the container. When a flowable mass of dielectric thermoplastic material is passed through the space between the container and the inner electrode, it is subjected to the high frequency electric current and is heated due to its dielectric losses sufficiently to cause it to be in a plastic state. Since the heat is developed within the dielectric material due to its dielectric losses, the material is heated substantially uniformly throughout its mass and the above-mentioned difficulties due to poor heat conduction are avoided.

According to the present invention such heating means may constitute part of a molding apparatus to cooperate with a mold cavity into which the heated plastic molding material can be ejected, or may constitute part of an apparatus for coating wire or other materials, or may be employed for other purposes.

These and other aspects of the invention, other advantages of the present invention, and objects of the invention will be apparent from the following description in conjunction with the accompanying drawings, in which:

Fig. 4 represents a sectional elevation to a smaller scale of a portion of another form of apparatus suitable for molding by an injection process and embodying the present invention.

Fig. 5 represents in the same scale as Fig. 4 a portion of another form of apparatus embodying the invention suitable for molding by an injection process and, in general, corresponding to the left-hand portion of Fig. 4;

Fig. 6 represents a sectional elevation of a portion of another form of apparatus for molding by an injection molding and corresponding generally to the left-hand portion of Fig. 4; and Fig. 7 represents a sectional elevation of an apparatus embodying the invention which may be employed for coating wire with a thermoplastic insulating or coating material.

In the drawings like reference characters refer to like parts throughout.

Figure 1:
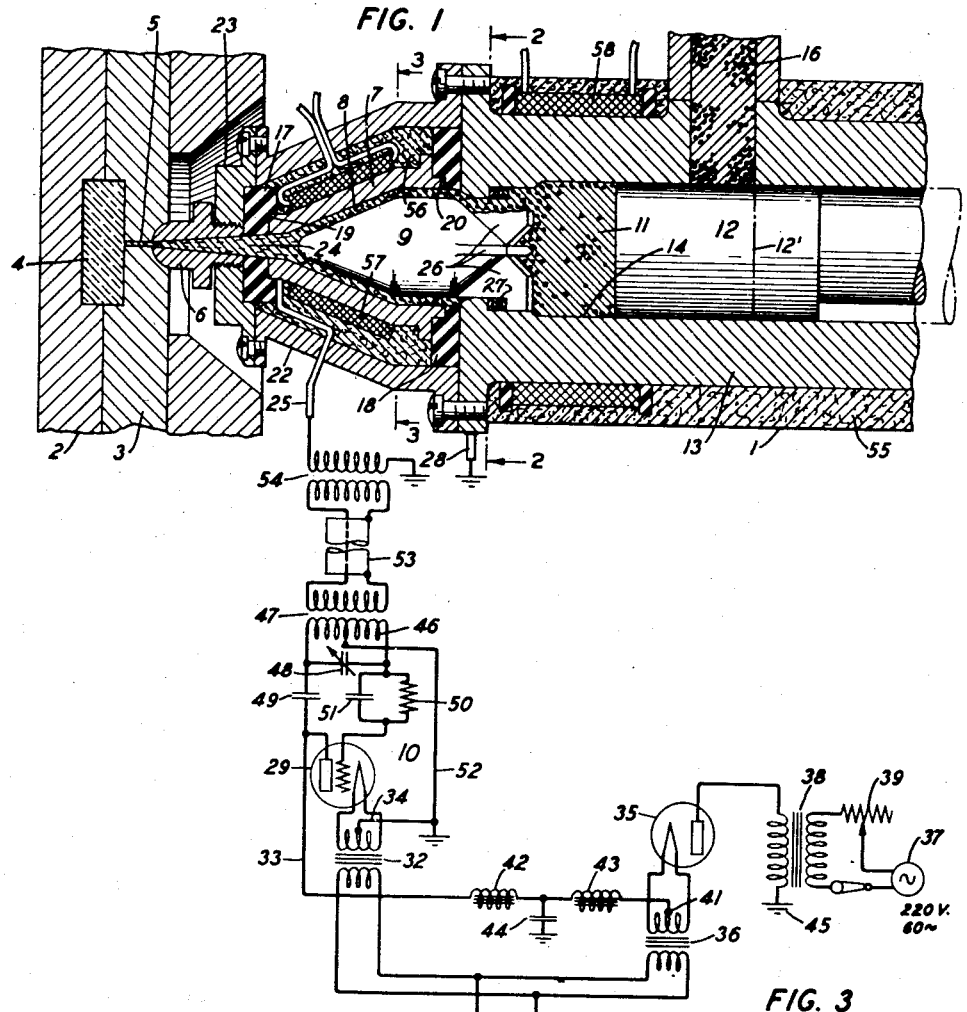
Fig. 1 represents to a reduced scale a sectional elevation of a portion of an injection type molding apparatus embodying the invention.
Figures 2, 3:
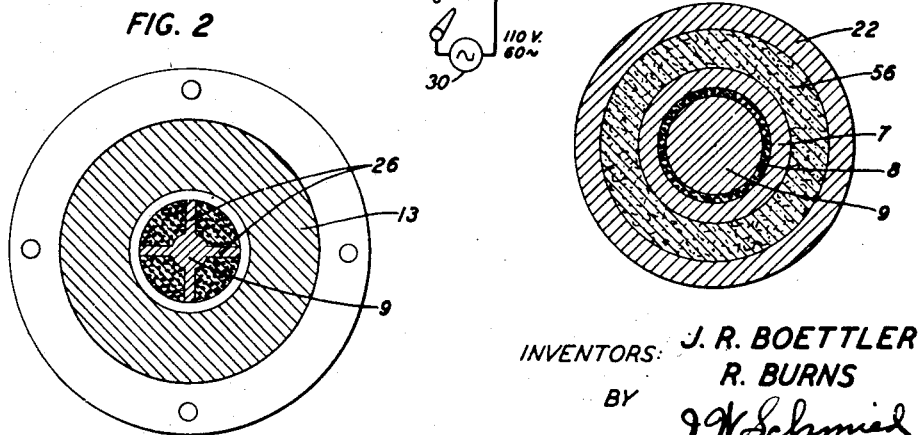
Fig. 2 represents a sectional elevation through the apparatus of Fig. 1 along line 2—2 of said figure.
Fig. 3 represents a sectional elevation through the apparatus of Fig. 1 along the line 3—3 of said figure.

The apparatus illustrated in Figs. 1, 2 and 3 as representing a portion of an injection type molding apparatus embodying the invention for molding organic thermoplastic materials, comprises a heater generally indicated by reference numeral 1 and a set of cooperating dies 2 and 3 which are shown in Fig. 1 in the closed position to define a cavity 4 of suitable shape in which the desired molded article is formed. A port 5 provides access to the cavity 4 for the entrance of plastic molding material. Nozzle 6 of the heater 1 is shown in Fig. 1 in contact with a recess at the entrance of port 5, in position to permit plastic molding material to pass from the interior of heater 1 into the mold cavity 4. Dies 2 and 3 of the illustrated apparatus are adapted to be separated to permit discharge of the molded article and to be brought together to form another article, and heater 1 is adapted to be brought into the illustrated mold-filling position and to be separated from the die 3, in the known manner by suitable means (not shown) which may be any one of many means known in the molding art.

The heater 1 of the illustrated apparatus comprises an elongated metal housing 7 having therethrough a cavity 8 of circular cross-section in which is disposed an elongated metal electrode member 9 of circular cross-section. Member 9 is disposed in spaced relation to the inner wall of the housing 7 and is electrically insulated from said housing 7. Housing 7 and member 9 constitute the electrodes of an electrical condenser connected to a suitable source of high frequency electrical energy indicated generally as 10. A flowable mass of thermoplastic dielectric molding material, such as a mass of comminuted solid thermoplastic molding material 11, is passed by suitable feeding means, such as reciprocatory piston 12 in the illustrated apparatus, to and through the space between the housing 7 and the member 9. While in said space, the thermoplastic material is heated due to its dielectric losses and put into a plastic state. The plastic mass is extruded through nozzle 6 by the feeding means into the mold cavity 4 to form the molded article.

More specifically, the apparatus illustrated in Figs. 1, 2 and 3 comprises a metal supporting member 13 having a cylindrical bore 14 therein in which feed piston 12 is adapted to be reciprocated by suitable means not shown. A passage 16 through supporting member 13 communicating with a suitable hopper or other storage means for comminuted molding material (not shown) is opened by the piston 12 when it is in the retracted position as shown by the broken lines 12' to discharge into bore 14 a suitable charge of comminuted molding material.

Affixed to the forward end of supporting member 13 of the illustrated apparatus is the hollow housing 7, which in the illustrated embodiment is of generally frustoconical shape. The interior cavity 8, which is also shown to be of frustoconical shape, communicates with the bore 14 of member 13. Said housing 8 is shown as mounted between and supported by insulators 17 and 18 of suitable material, a suitable recess 19 in insulator 17 and a suitable recess 20 in insulator 18 being provided to aid in accurately locating the housing 7. A frustoconical supporting member 22 the large end of which is bolted to the front end of member 13 and supports insulator 18 and the other end of which has bolted thereto cap 23 supporting insulator 17 serves to clamp firmly and accurately in place the housing member 7, as shown. Cap 23 carries nozzle 6 which has a passage 24 therethrough, the inner end of which communicates with the interior of housing 7 and the outer end of which is adapted to register with the inlet port 5 of the die member 3 to make possible the passage of plastic molding material from the interior of housing 7 into the mold cavity 4.

An electrical lead 25 is provided to connect housing 7 with a suitable source of high frequency electrical energy 10.

Metal electrode member 9 which may be solid or hollow, is shown in Figs. 1, 2 and 3 as being rigidly mounted inside of housing 7. This member 9 is shown as being of elongated torpedo-shape to provide a space of substantially uniform thickness between the surface of the body and the inner wall of the housing member 7, and is supported at its rear end by its vanes 26 which also serve to permit the passage therebetween of comminuted molding material into the space between body 9 and housing 7. Spacing washers 27 are shown in Fig. 1 to make possible lengthwise adjustment of the member 9 to provide adjustment of the shape of the space between the member 9 and the inner surface of housing 7. Electrical contact is made with member 9 by contact of the vanes 26 of said member with supporting member 13, to which a lead 28 is connected from the source of high frequency electrical current 10.

The source of high frequency energy 10 as shown in Fig. 1 is one which has been found satisfactory for use with heating apparatus embodying the invention.

In the source 10 of Fig. 1, a power oscillator electron tube 29 of sufficient output for the application has its filament heated from the alternating current supply 30 through step-down transformer 32. The plate of tube 29 is shown as supplied with substantially pure direct current through lead 33 and the ground circuit through center tap 34 on the filament side of transformer 32 from rectifying electron tube 35 which is shown as a half-wave rectifier. In the illustrated embodiment the filament of rectifying tube 35 is heated from alternating current supply 30 through step-down transformer 36. The plate circuit of said tube is supplied with current from alternating current supply source 37 through transformer 38 which steps up the voltage to a suitable value. Variable resistance 39 is shown in the circuit between the alternating current supply source 37 and the primary side of transformer 38 to control the voltage in the plate circuit of tubes 35 and 29. The rectified current passes from tube 35 through center tap 41 on the filament side of transformer 36 and through lead 33 to the plate of oscillator tube 29, radio frequency chokes 42 and 43 and condenser 44 constituting a filter for smothing out ripples in the rectified current and preventing the passage of radio frequency currents from the oscillator tube 29 into the rectifying circuit. The circuit for the direct current is completed through the center tap 34, the ground, and the ground connection 45.

The oscillation circuit associated with oscillator tube 29 comprises coil 46 of transformer 47 and a variable condenser 48 which is connected across the coil and constitutes the tuning means. One terminal of the coil 46 is connected to the plate of tube 29 through blocking condenser 49 and the other terminal is connected to the grid of tube 29 through grid leak 50 and condenser 51. An adjustable tap on coil 46 is connected through lead 52 to the center tap 34 of the filament side of transformer 32.

The high frequency electrical current output of the oscillator 10 is delivered through transformer 47, coaxial conductor line 53 and transformer 54 to the leads 25 and 28 of heater 1.

The source of high frequency energy 10 shown in Fig. 1 is, of course, illustrative. Other sources of such energy may be employed and modifications may be made in the illustrated circuit without departing from the inventive concept.

The heater 1 of the apparatus of Figs. 1 to 3, inclusive, is shown as provided with a covering of heat insulating material 55 on its supporting member 13, and a covering of heat insulating material 56 on its housing 7 to reduce heat losses, increase the speed with which the apparatus may be brought to operating conditions, and in general to increase the efficiency of the apparatus. The heater 1 is also shown as provided with an auxiliary electrical heating means 57 about housing 7 and auxiliary electrical heating means 58 about member 13. Such auxiliary heating means, although not absolutely necessary, are advantageous in supplying heat to make up for that lost through conduction and radiation from the metal parts of the apparatus. They also prevent chilling of the heated thermoplastic material by the metal parts, and thus make for more efficient operation of the apparatus. Such auxiliary heating means may be operated only during the initial period of operation of the apparatus, or may be operated continuously.

In operation of the molding apparatus of Fig. 1, the piston 12 is first retracted to a position such as that shown by a broken line 12' which uncovers the passage 16 through which a charge of comminuted thermoplastic dielectric molding material is supplied. The reciprocation of the piston is so adjusted that after a suitable charge of such cominuted molding material has entered the bore 14 of cylinder 13, the piston moves forward to close the passage 16 and to cause the mass of comminuted molding material to flow into the space between the inner wall of housing 7 and inner electrode member 9. A high frequency electrostatic field is impressed upon the molding material when it is in this space by housing 7 and member 9 which constitutes electrodes connected to the source 10 of high frequency energy. Such electrostatic field causes heating of the molding material within its mass due to the dielectric losses of the material. The electrostatic field is of sufficient strength and the material is passed through the space between the housing 7 and member 9 at a rate such that the molding material is in a condition of a substantially uniformly heated, substantially uniformly plastic mass when it passes out of said space. Further movement of the piston 12 causes the comminuted molding material in front of the piston to push the heated plastic molding material out through nozzle 6 into the mold cavity 4 of the dies 2 and 3.

By suitable means, not shown, the travel of the piston is so adjusted that the proper amount of plastic molding material to fill the die is forced into the mold cavity 4 and, after the mold cavity is filled, the heater 1 is separated from the dies and the dies are separated to permit removal of the molded part in the known manner.

The thermoplastic molding material is thus heated rapidly and substantially uniformly throughout its mass by the apparatus of the present invention, and the difficulties caused by nonuniform heating of the molding material in conduction heaters are completely avoided.

The apparatus shown in Fig. 4 is generally similar to that of Fig. 1 in that it comprises dies 2 and 3 having a mold cavity 4 adapted to be filled by plastic molding material which is heated by heater 59 embodying the present invention. Heater 59 comprises a supporting member 61 and a nozzle member 62 having clamped therebetween by bolts 63 an intermediate elongated hollow cylindrical housing 64. Insulating washers 65 and 66 of suitable material are provided as shown to locate and support housing 64 with respect to members 61 and 62, and to insulate housing 64 from said members 61 and 62.

An inner electrode member 67 of elongated generally cylindrical configuration is mounted within the generally cylindrical cavity 68 extending through housing 64, being supported by its vanes 69 at each end thereof which contact members 61 and 62. Thus, inner member 67 is insulated from housing 64, and a substantially unobstructed annular space is provided between inner member 67 and electrode member 64. On each cross-section through the members 69 and 67, the width of the space is substantially uniform.

Supporting member 61 is provided with a bore 70 in which is slidably mounted a reciprocatory feed piston 71 adapted to be actuated by suitable means (not shown). Passage 72 through which comminuted dielectric thermoplastic molding material is supplied communicates with the bore 70 of supporting member 61 and is adapted to be uncovered as the piston 71 is retracted to permit a charge of comminuted molding material to be discharged into bore 70.

A source of high frequency electrical current, not shown, but which may be similar to that shown in Fig. 1, is connected to housing 64 and inner member 67 through transformer 54 and lead 25 connected to housing 64 and lead 28 connected to supporting member 61 which makes contact through vanes 69 with inner member 67. In the apparatus of Fig. 4, supporting member 61, housing member 64 and nozzle member 62 are shown as provided with a covering layer 73 of heat insulation material which reduces heat losses and provides for more efficient operation of the apparatus.

The operation of this apparatus is generally similar to the operation of the apparatus of Figs. 1 to 3, inclusive. In operation of the apparatus of Fig. 4, retraction of piston 71 uncovers passage 72 which permits discharge of comminuted dielectric thermoplastic molding material to pass into bore 70. Forward movement of the piston causes the mass 11 of comminuted molding material to flow into the space between housing 64 and inner member 67, where it is heated throughout its mass due to the electrical losses induced therein by the high frequency electrostatic field impressed on it by the high frequency electrical current source connected to the electrode members 64 and 67. The electrostatic field and the rate of movement of the flowable mass of thermoplastic material through said space are such that when the molding material passes out of said space and into the interior of the nozzle member 62, it is in a substantially uniformly heated, substantially uniformly plastic condition. Additional comminuted thermoplastic material passed into said space by forward movement of said piston 71 forces the plastic material out through the passage 74 of nozzle member 62 into the mold cavity 4. Other details of the operation of the apparatus of Fig. 4 are similar to those of the apparatus of Figs. 1 to 3, inclusive, and require no further description.

The molding apparatus of Fig. 5 is generally similar to that of Fig. 4 in that it comprises an intermediate elongated hollow cylindrical housing 64 insulating supported between a nozzle member 75 and a supporting member containing suitable feed means (not shown), in the interior of which housing 64 and in spaced relation thereto is supported an inner electrode member 67 which is insulated from member 64. Members 64 and 67 are connected through transformer 54 to a suitable source of high frequency energy (not shown). Nozzle member 75 is adapted, as in the apparatus of Fig. 4, to discharge through passage 74 molding material, which is in the heated plastic state due to its passage through the space between the member 64 and 67, into the mold cavity 4 defined by cooperating dies 2 and 3 when they are in the closed position as shown. The apparatus of Fig. 5, moreover, comprises means for forcing the heated plastic molding material out through the passage 74 of nozzle member 75 and into the cavity 4 which is an addition to the means for causing thermoplastic material to flow between the inner member 67 and the member 64. Such means in the apparatus of Fig. 5 comprises a reciprocatory piston 76 operating in a bore 77 formed in nozzle member 75. Piston 76 is caused to operate in suitable timed relation to the remainder of the apparatus to force the proper amount of plastic molding material into the mold cavity 4 when the nozzle member 75 is in contact with the die member 3 as shown in Fig. 5.

In all other respects, the operation of the apparatus of Fig. 5 is similar to that of the operation of the forms of apparatus shown in Figs. 1 to 4, inclusive.

The molding apparatus of Fig. 6 is generally similar to that of Fig. 4 in that said apparatus comprises an intermediate elongated hollow cylindrical housing 64 constituting one electrode, an elongated generally cylindrical inner member 67 mounted therein in spaced and insulated relation thereto constituting another electrode, and a member 78 carrying a discharge nozzle. Member 78 in this embodiment is provided with a smaller auxiliary heating means embodying the present invention comprising an elongated generally cylindrical housing 79, clamped by bolts 80 between member 78 and nozzle member 81, which is located and insulated by insulating washers 82 and 83. Said member 79 has mounted therein an elongated generally cylindrical inner electrode member 84 supported by member 78 and nozzle member 81 through vanes 69. Inner member 84 is thus insulated from and separated from housing 79 by a substantially unobstructed space of uniform width around the member 79 on each cross-section through members 79 and 84. Housing 79 and inner member 84 are connected to the poles of a source of high frequency current (not shown) through transformer 54. The auxiliary heating means of Fig. 6 is advantageous in that it prevents cooling of the thermoplastic molding material which might occur after it had been once heated to the plastic state by apparatus embodying the invention.

The operation of this apparatus of Fig. 6 in molding by injection of the heated plastic molding material into cavity 4 of dies 2 and 3 is similar to that of the apparatus of Figs. 1 to 4, inclusive, and requires no further discussion.

Fig. 7 illustrates an extrusion apparatus embodying the present invention shown as adapted to coating a strand with a material which must be heated to be put into a plastic state suitable for coating. The apparatus of Fig. 7 is shown more specifically as employed for coating an electrical conductor wire with a thermoplastic organic insulating material. Said apparatus comprises a supporting member 85 and a nozzle member 62 between which are clamped by bolts 63 an intermediate elongated hollow cylindrical housing 64 which is located and insulated by insulating washers 65 and 66. An elongated generally cylindrical inner electrode member 86 is supported within member 64 in spaced and insulated relation thereto by supporting member 85 as shown. The wire 87 to be coated is passed through an opening 88 through the supporting member 85 and inner member 86 and out through opening 89 in nozzle member 62.

A mass of comminuted solid thermoplastic coating material is caused to flow continuously and at a substantially uniform rate into the space between the members 64 and the inner member 86, by means of rotating screws 91. Such material is supplied to said feed screws through openings, indicated by the broken lines 92, in the upper portion of the apparatus.

In the apparatus of Fig. 7, the nozzle member 62, supporting member 85 and housing 64 are covered with a layer of heat insulating material 73 to reduce heat losses and provide for more efficient operation. Lead 25 connected to housing 64 and lead 28 connected to supporting member 85 which makes electrical contact with inner member 86 are connected to a source of high frequency current, not shown, through transformer 54.

In operation of the apparatus of Fig. 7, comminuted solid thermoplastic material is caused by feed screws 91 to flow into the space between the housing 64 and inner electrode member 86. While in said space, such material is exposed to a high frequency electrostatic field between the housing 64 and member 86, and becomes heated due to its dielectric losses. The intensity of the electrostatic field and the rate of flow of the material through the space are such that when the thermoplastic material reaches the end of said space it is substantially uniformly heated throughout its mass and is substantially uniformly plastic. Additional comminuted thermoplastic material entering the space between the electrode member and the intermediate member causes the plastic matrial to be extruded through the opening 89 in the nozzle member to form a coating around the wire passing through said opening. The size and shape of the opening 89 and the speed of the wire are such that a coating of the desired thickness is formed on the wire. The wire may then be cooled and otherwise treated in manners known to those skilled in the art.

In each of the above embodiments of the invention, the space between the inner electrode and the outer electrode surrounding the inner electrode, in which space the dielectric material is heated, is shown as being of substantially uniform thickness throughout the length of the space. However, in some cases it is desirable to provide different rates of heating of the dielectric material at different distances along the length of said space to provide a desirable heating cycle; this difference in heating rates may be provided by so shaping the outer surface of the inner electrode and the inner surface of the outer electrode that the space therebetween is of different thicknesses at different distances along the length of said space. Moreover, the outer surface of the inner electrode and the inner surface of the outer electrode may be of other cross-sectional shapes than the circular cross-sectional shape shown in each of the illustrated embodiments of the invention. In any event, it is advantageous that the space between the outer surface of the inner electrode and the inner surface of the outer electrode, in which space the dielectric material is heated be substantially unobstructed to permit smooth flow and uniform heating of the flowable mass of molding material, and that on each cross-section along the length of the portion of the apparatus in which the inner electrode and the outer electrode cooperate to define the heating space, the space is of uniform thickness as is shown in each of the illustrated embodiments; non-uniform thickness might tend to cause overheating of the material at the thinner portions of the space.

The present invention thus provides heating apparatus which may be employed for a variety of purposes and which is particularly advantageous for the uses indicated above. Such apparatus makes possible uniform heating of dielectric materials and makes possible the production of plastic masses which are of highly uniform consistency and free from overheated portions. The apparatus of the present invention thus overcomes difficulties hitherto present in prior apparatus.

The thermoplastic materials which may be heated by apparatus embodying the invention are those which may be rendered plastic by heat and which have dielectric characteristics such that they may be heated by their dielectric losses. They may be materials which are not thermosetting, such as cellulose acetate, cellulose acetate butyrate, or polystyrene, or may be thermosetting materials which may be put by heat into a plastic state which exists before setting of the material for a period sufficient to permit the plastic material to pass out of the apparatus.

It is apparent that the above embodiments of the invention are illustrative and that various modifications may be made therein, that various other forms of apparatus embodying the invention may be provided, that apparatus embodying the invention may be employed for heating of materials other than those indicated above, and that apparatus embodying the invention may be employed for purposes other than those indicated above without departing from the spirit of the invention.

It is intended that the patent shall cover by suitable expressions in the appended claims whatever features of patentable novelty reside in the invention.

What is claimed is:

1. An apparatus for heating solid dielectric material which is capable of being put into a plastic state by heating, comprising a housing having extending longitudinally therein an elongated passage and comprising an end member containing a discharge opening communicating with said passage, another end member containing a supply opening communicating with said passage through which finely divided material to be heated is supplied to said passage, and an elongated outer electrode member of electrically conductive material defining a portion of said passage and located between and rigidly fixed to said end members but electrically insulated therefrom; an elongated inner electrode member formed of electrically conductive material disposed in and extending longitudinally of said outer electrode member of said housing member and cooperating therewith to define between said outer electrode member and said inner electrode member an elongated substantially unobstructed space through which the material being heated can pass; means which rigidly supports said inner electrode member from at least one of said end members of said housing without substantially obstructing said passage through said housing; means for applying a high frequency electrical current to said outer electrode member of said housing and said inner electrode member; mechanical means, associated with said end member of said housing containing said supply opening, for positively forcing the dry comminuted solid dielectric material into said space between said electrode members in which space said material is heated due to its dielectric losses by high frequency current applied to said electrode members sufficiently to put said material into a plastic condition before it passes out of said space into the portion of said passage in said housing leading to said discharge opening; and a supplemental heater adjacent to at least a portion of said housing and cooperating therewith to heat said housing and to conserve the heat generated dielectrically in said material.

2. The apparatus of claim 1 in which said means rigidly supporting said inner electrode member comprises at an end of said inner electrode member a plurality of supporting members of thin cross-section extending from said electrode member to the end member of said housing adjacent said end of said inner electrode member.

3. The apparatus of claim 1 in which the passage through said outer electrode member is circular in cross-section, in which the exterior surface of said inner electrode member is circular in cross-section, and in which said outer electrode member and said inner electrode member cooperate to define a substantially unobstructed space through which the material being heated can pass which is annular in cross-section.

4. A heating apparatus for heating solid dielectric material which is capable of being put into a plastic state by heating comprising an elongated inner electrode member formed of electrically conductive material; an elongated outer electrode member formed of electrically conductive material having a longitudinal passage extending therethrough and surrounding said inner electrode member, said inner electrode member and said outer electrode member cooperating to define therebetween a substantially unobstructed elongated space through which the material being heated can pass; a member disposed at one end of said outer electrode member which is rigidly fixed to and electrically insulated from said outer electrode member and which contains a supply opening through which the material to be heated is supplied and a passage which communicates with said supply opening and said space between said electrode members; a member disposed at the other end of said outer electrode member which is rigidly fixed to and electrically insulated from said outer electrode member and which contains a discharge opening and, communicating with said discharge opening and said space between said electrode members, a passage which has walls shaped to provide a smooth continuous flow of plastic material from said space to said discharge opening; means which rigidly supports said inner electrode member from at least one of said end members of said housing without substantially obstructing said passage through said housing; means for applying a high frequency electrical current to said outer electrode member and to said inner electrode member, whereby the dry comminuted solid dielectric material which is in the space between said electrode member is heated due to its dielectric losses by high frequency electrical current supplied to said electrode members sufficiently to put said material into a plastic condition before it passes out of said space into said passage leading to said discharge opening; and a supplemental heater surrounding said outer electrode member and cooperating therewith to heat said outer electrode member and to conserve the heat generated dielectrically in said material.

5. Apparatus for dielectrically heating materials for molding, comprising two members providing an electrical condenser, one member being of tubular construction and the other member being disposed longitudinally within and spaced from the first member, means providing molding material entrance and exit passages into and from the tubular member, the molding material being heated by the high frequency dielectric field between said members as the material passes through the tubular member, and a supplemental heater surrounding the tubular member and cooperating therewith to heat the outer portion of the tubular member and to conserve the heat generated dielectrically in said field.

JACOB R. BOETTLER.
ROBERT BURNS.

REFERENCES CITED

The following references are of record in the file of this patent:

UNITED STATES PATENTS

| Number | Name | Date |
|---|---|---|
| 1,522,188 | Hull | Jan. 6, 1925 |
| 1,933,528 | Wallace et al. | Oct. 31, 1933 |
| 2,296,948 | Pitman | Sept. 29, 1942 |
| 2,309,496 | Bird et al. | Jan. 26, 1943 |
| 2,370,883 | Smith | Mar. 6, 1945 |

FOREIGN PATENTS

| Number | Country | Date |
|---|---|---|
| 517,798 | Great Britain | Feb. 8, 1940 |